July 14, 1931.  W. V. McGUINNESS ET AL  1,814,947
AUTOMATIC SELECTIVE PNEUMATIC TUBE CARRIER RELAY
Filed July 30, 1930  2 Sheets-Sheet 1

Inventor
W. V. McGuinness
W. H. Francis

Eugene C. Brown
Attorney

July 14, 1931. W. V. McGUINNESS ET AL 1,814,947
AUTOMATIC SELECTIVE PNEUMATIC TUBE CARRIER RELAY
Filed July 30, 1930 2 Sheets-Sheet 2
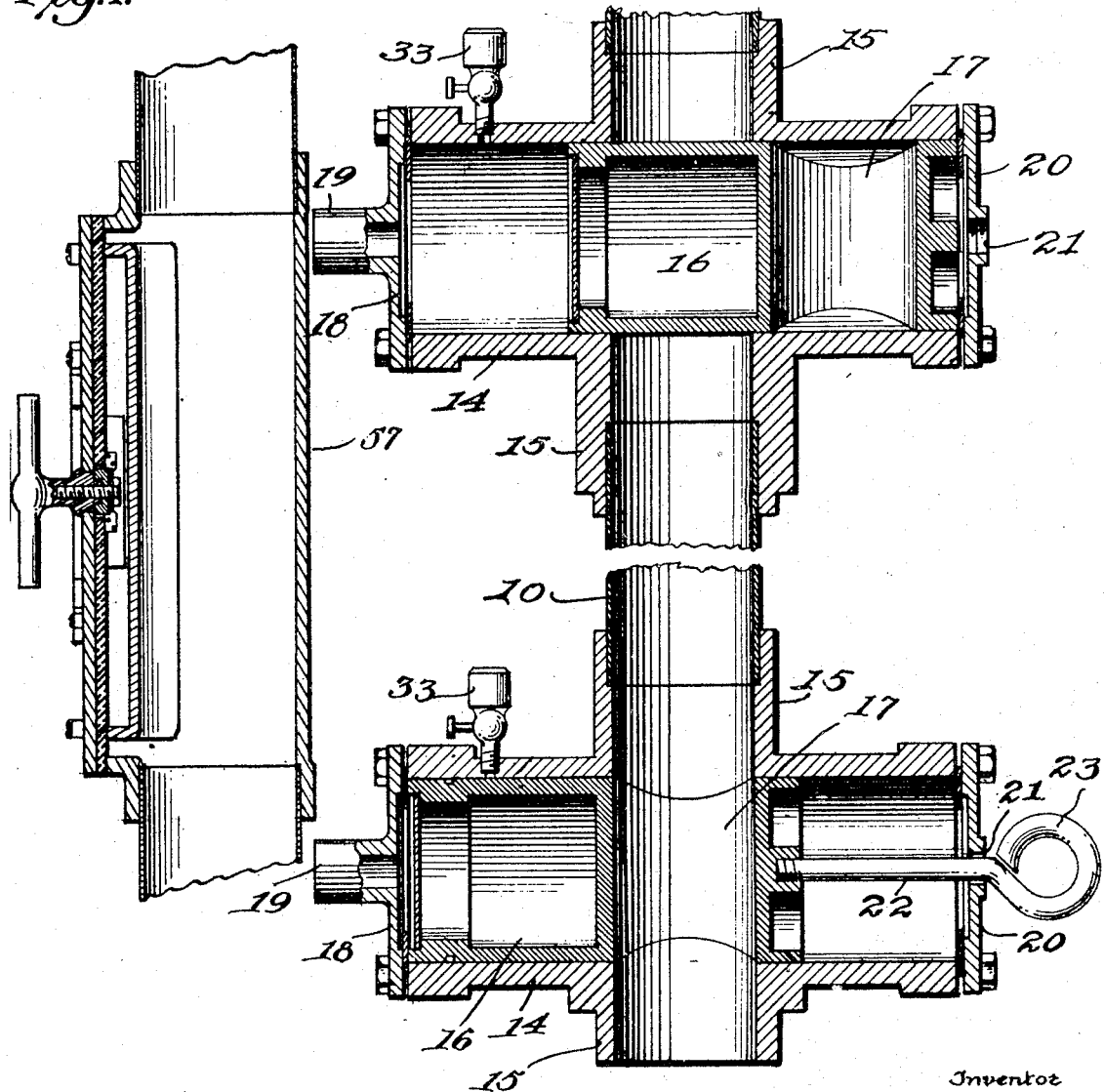
Inventor
W. V. McGuinness
W. H. Francis
Eugene C. Brown
Attorney Patented July 14, 1931

1,814,947

UNITED STATES PATENT OFFICE

WILLIAM V. McGUINNESS, OF FLUSHING, NEW YORK, AND WILLIAM H. FRANCIS, OF JERSEY CITY, NEW JERSEY, ASSIGNORS TO THE WESTERN UNION TELEGRAPH COMPANY, OF NEW YORK, N. Y., A CORPORATION OF NEW YORK

AUTOMATIC SELECTIVE PNEUMATIC TUBE CARRIER RELAY

Application filed July 30, 1930. Serial No. 471,746.

This invention relates to pneumatic tube systems of the type in which short cylindrical carriers are used to convey messages and other articles through long tubes from place to place under pneumatic pressure.

In such systems it is frequently desirable to cause the carriers from a number of tubes to pass into a single tube. For instance, comparatively short branch tubes may run from sub-stations in a building to a gathering point at which they are delivered to a comparatively long tube extending to another building or to a remote part of the same building. At such gathering points jambing of the carriers is apt to take place by two or more carriers being delivered to the main conveyor tube at the same instant, unless provision is made whereby the carriers are fed to the main tube successively.

Among the objects of the present invention are the provision of a novel form of timing apparatus for regulating the passage of carriers through the branch tubes to the main tube; the provision of means in each branch tube for preventing the collection of two or more carriers at the delivery end of the branch tube; the provision of carrier controlling valves in each branch tube and the provision of means for actuating the valves in each tube in alternation and the like valves in the several tubes in timed succession.

With the above and other objects in view one form of the invention will now be described in detail, reference being had to the accompanying drawings wherein:—

Figure 3 is an enlarged detail diametrical section through the axes of one of the valved tubes and its valves.

Figure 4 is a sectional view of a portion of one of the tubes showing a closed type sending inlet adapted to be used in connection with this invention.

Figures 1, 2:
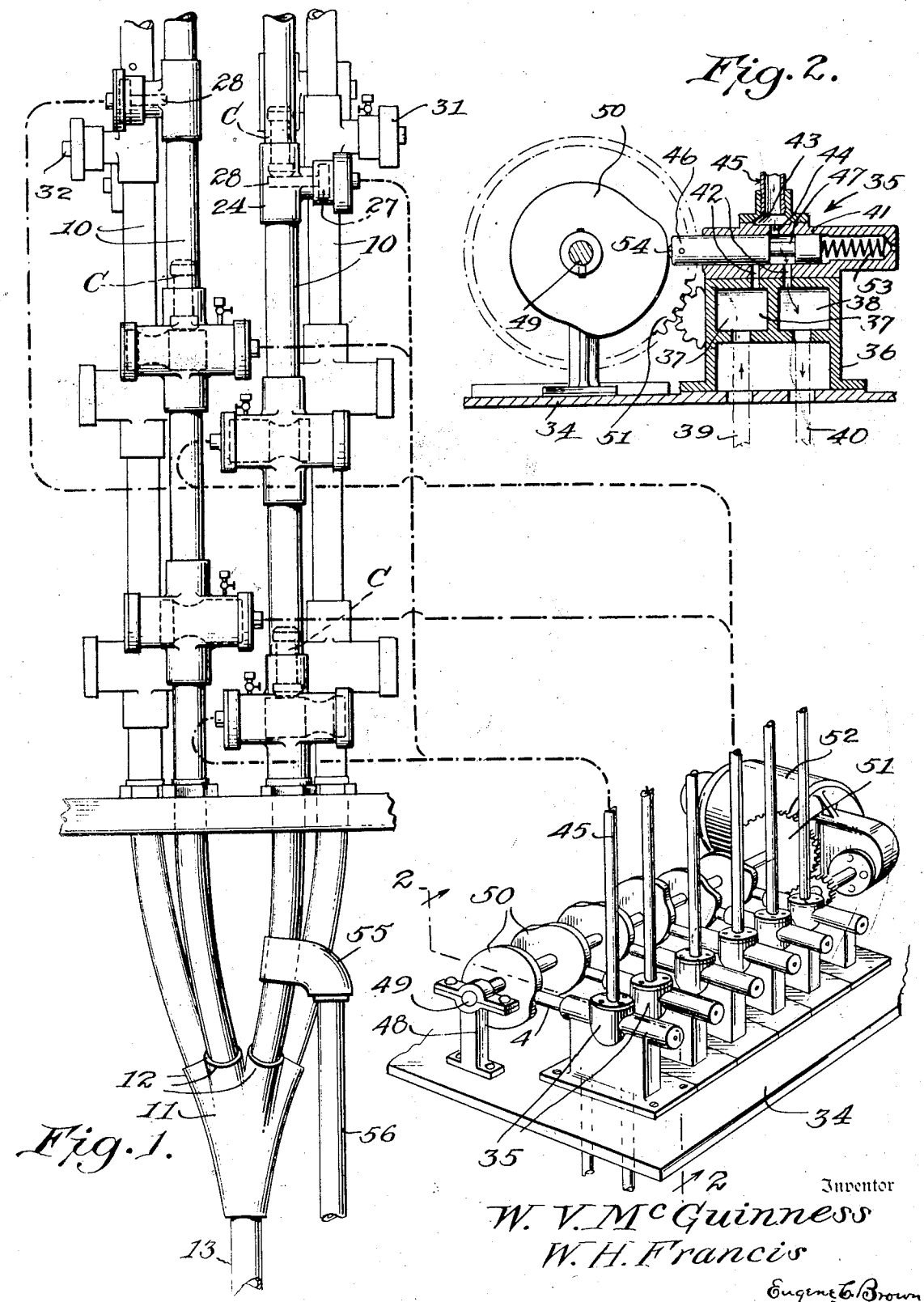
Figure 1 is a view partly in elevation and partly in perspective and illustrating the complete device.
Figure 2 is an enlarged detail section on the plane 2—2 of Figure 1.

In the embodiment of the invention illustrated herein, a series of branch tubes 10 are shown and these tubes are to be understood as leading from different dispatching stations. A gathering head or manifold 11 is provided of general conical form, the tubes 10 leading into respective nipples or sockets 12 formed on the upper end of this head. A main conveyor tube 13 extends from the lower end of the head 11 to a remote delivery point. Three valves are interposed in spaced relation in each tube 10 to control the passage of the carriers, the two lowermost being of identical construction. Each of these lower valves includes a horizontal valve casing 14, from which extend vertically the opposed pipe or tube sockets 15, for connection of sections of the tube 10. A plunger 16 of hollow construction but closed at both ends is slidably mounted in the casing 14 and has adjacent one end a tubular passage 17 of the same internal diameter as the tube 10. This plunger and the casing 14 are of such lengths that the plunger may slide to one end of the casing to bring the passage 17 into alinement with the tube 10 and may slide to the other end of the casing to close communication between the sections of the tube 10 above and below the valve respectively. The extreme positions of the plunger are clearly shown in Figure 3. A head 18 closes one end of the casing 14 and is provided with a nipple or pipe socket 19. Similarly a head 20 closes the other end of the casing 14 and is provided with a central opening 21 which permits free ingress and egress of air from this end of the casing, so that movement of the plunger, due to air pressure or vacuum in the other end of the casing, is not hindered. If it is desired to provide means for operating a valve manually a stem 22 may project through the opening 21 and have its inner end attached to the plunger 16 and its outer end provided with a finger grip or ring 23. Preferably the lower valve is always thus provided with means for operating it manually.

A third or upper valve has a tubular body 24 having end sockets for the reception of adjacent ends of two sections of the tube 10. A tubular neck 25 extends laterally from the body 24 and opens into a cylinder 26. A piston 27 is mounted in this cylinder for movement toward and from the body 24 and a pin or rod 28 extends from the piston through the neck 25. This pin forms a valve or stop for the carriers. When the piston is moved inwardly towards the body 24, the pin 28 extends across the opening through the body and thus prevents downward movement of the carriers C, as shown in the upper right hand part of Figure 1. With the piston 27 in its outer position, as in Figure 3, the pin 28 is retracted and the passage through the body 24 is clear for the movement of a carrier therethrough. The piston is provided with a push rod 29, for digital adjustment to open position and a limit screw 30 is also provided for limiting inward movement of the piston and pin 28. A head 31 closes the end of the cylinder 26 and is provided with a pipe socket or nipple 32. Oil or grease cups 33 are provided for the several valves.

In order to operate the valves in each tube alternately and the valves in the several tubes in spaced timed relation certain controlling apparatus is provided. This controlling apparatus includes a base 34, whereon is mounted a series of controlling valves indicated in general at 35. Each control valve includes a base member 36 having a pressure chamber 37 and a vacuum chamber 38 formed therein and connected to a pressure and vacuum pump (not shown) by a supply pipe 39 and exhaust pipe 40. A cylinder 41 is supported above the chambers 37 and 38 and communicates therewith through spaced ports 42. A chamber 43 is formed above the cylinder 41 and communicates with the cylinder through the port 44. A pipe 45 connects the chamber 43 with one or more of the valves in the tubes 10. Reciprocating in the cylinder 41 is a plunger 46 having an annular groove 47, this plunger being capable of such movement as will establish communication between the port 44 and the ports 42 selectively, so that the pipe 45 may be placed in communication with either the supply pipe 39 or exhaust pipe 40 according to the position of the plunger. Bearings 48 are mounted on the base 34 and support a cam shaft 49 carrying a series of cams 50. The cam shaft 49 is driven by a suitable motor 52 through gearing 51. Each plunger 46 is urged toward a respective cam 50 by a spring 53 and carries an anti-friction roller 54 which engages the cam.

The cams 50 are so arranged on the shaft that they operate the plungers to connect the pipes 45 to the pressure pipes 39 in timed relation and then connect said pipes to the vacuum pipes 40 in like timed relation. Thus the valves in the tubes 10 are moved by pressure to close and by vacuum to open. It will be noted the plungers 16 for each tube 10 work in opposition and that the pin 28 works in unison with the lower plunger 16. Thus for each tube the pin and lower plunger 16 are in closed position when the upper plunger 16 is in open position and does not open until said upper plunger is closed. Also the lower plungers in the several tubes, and consequently the upper plungers and pins, open one after the other in spaced time relation. Thus, the carriers C are delivered to the tube 13 one after another at timed intervals so spaced that, at no time, can two carriers be so positioned as to interfere with each other in entering the tube 13.

A by-pass 55 and pressure pipe 56 are shown connected to one of the tubes 10. Air from the pressure pipe 56 flows through the by-pass 55 and gathering head 11 and blows carriers discharging from any of the incoming tubes 10 through the tube 13 to a distant point. Obviously carriers might also be propelled through the tube 13 by suction applied at the distant end of the tube. Pipe 56 would then be open to atmospheric pressure instead of being pressure connected as above.

A door 57 may be arranged on one or more of the tubes 10 to permit insertion or withdrawal of a carrier or carriers at any convenient point.

Obviously, it is intended that the operation of the device shall be automatically controlled by the bank of valves 35, but in the event of a breakdown of this part of the apparatus or if for any reason manual operation is desired and these valves are not used, the upper pistons 27 may be set open by pushing on the rods 29, and then holding these pistons open by means of the screws 30. Then alternate manipulation of the plungers 16, by means of the stems 22, so that one plunger always closes the tube 10 when the passage 17 of the other is in alignment with the tube 10, will manually discharge carriers after arrival.

We claim:

1. In a pneumatic tube system for transmitting carriers, a series of branch tubes, a plurality of spaced movement controlling valves for said carriers in each branch tube, and means for actuating the valves in each tube in alternation.

2. In a pneumatic tube system for transmitting carriers, a series of branch tubes, a plurality of spaced movement controlling valves for said carriers in each branch tube, and means for actuating the valves in each tube in alternation and for actuating the like valves of the several tubes in timed succession.

3. In a pneumatic tube system for transmitting carriers, a series of branch tubes, a gathering head having the branch tubes connected thereto, a single transmission tube leading from said head, a plurality of spaced movement controlling valves for said carriers in each branch tube, and means for actuating the valves in each tube in succession.

4. In a pneumatic tube system for transmitting carriers, a series of branch tubes, a gathering head having the branch tubes connected thereto, a single transmission tube leading from said head, a plurality of spaced movement controlling valves for said carriers in each branch tube, pneumatic cylinders each associated with a respective valve to effect opening and closing of the valve, vacuum and pressure pipes having operative connection with said cylinders, control valves movable to connect the respective cylinders alternately to the vacuum and the pressure pipes, and means to operate the control valves in timed relation.

5. In a pneumatic tube system for transmitting carriers, a series of branch tubes, a gathering head having the branch tubes connected thereto, a single transmission tube leading from said head, a plurality of spaced movement controlling valves for said carriers in each branch tube, pneumatic cylinders each associated with a respective valve to effect opening and closing of the valve, vacuum and pressure pipes having operative connection with said cylinders, control valves movable to connect the respective cylinders alternately to the vacuum and the pressure pipes, and means to operate the control valves in timed relation, said means being arranged to cause the movement of the valves in each tube to open sequentially and to close sequentially and to cause the valves in each tube to open and close in timed relation to the valves in the remaining tubes.

6. In a pneumatic tube system for transmitting carriers, a series of branch tubes, a gathering head having the branch tubes connected thereto, a single transmission tube leading from said head, a plurality of spaced movement controlling valves for said carriers in each branch tube, pneumatic cylinders each associated with a respective valve to effect opening and closing of the valve, vacuum and pressure pipes having operative connection with said cylinders, control valves movable to connect the respective cylinders alternately to the vacuum and the pressure pipes, and means to operate the control valves in timed relation, said means being arranged to cause the upper and lower valves to open and close simultaneously and in alternation with the intermediate valve.

In testimony whereof we affix our signatures.

WILLIAM V. McGUINNESS.
WILLIAM H. FRANCIS.